(12) United States Patent
Toyohara et al.

(10) Patent No.: US 6,389,240 B2
(45) Date of Patent: May 14, 2002

(54) IMAGE FORMING APPARATUS HAVING PLURAL IMAGE PROCESSING SPEEDS AND PLURAL IMAGE CORRECTION CHARACTERISTICS

(75) Inventors: Yuichiro Toyohara, Kanagawa; Kenichiro Kitajima, Ibaraki, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/861,550

(22) Filed: May 22, 2001

(30) Foreign Application Priority Data

May 31, 2000 (JP) .................................. 2000-162938

(51) Int. Cl.$^7$ .............................................. G03G 15/00
(52) U.S. Cl. ........................................ 399/38; 399/396
(58) Field of Search ............................. 399/38, 46, 51, 399/52, 66, 67, 68, 396

(56) References Cited

U.S. PATENT DOCUMENTS 5,170,215 A * 12/1992 Pfeuffer ...................... 399/68
5,859,933 A   1/1999 Sasanuma et al. .......... 382/275
5,907,741 A * 5/1999 Matsuzawa et al. ......... 399/44

FOREIGN PATENT DOCUMENTS

| JP | 5-193191 | * 8/1993 |
| JP | 7-131607 |   5/1995 |

* cited by examiner

Primary Examiner—Arthur T. Grimley
Assistant Examiner—Hoang Ngo
(74) Attorney, Agent, or Firm—Fitzpatrick, Cella, Harper & Scinto

(57) ABSTRACT

An image forming apparatus includes an LED array for performing exposure according to an input image signal, a photoconductive drum on which an electrostatic latent image is formed by exposure with the LED array, a developing device for making the electrostatic image visible, a transfer charger for transferring the visible image onto a transfer material, and a fixing device for fixing the image on the transfer material. When the operating speed in an image forming process equals the image forming speed, and the image forming speed can be switched among a plurality of levels, the image forming condition is changed in accordance with the image forming speed.

16 Claims, 6 Drawing Sheets

IMAGE FORMING APPARATUS HAVING PLURAL IMAGE PROCESSING SPEEDS AND PLURAL IMAGE CORRECTION CHARACTERISTICS

BACKGROUND OF THE INVENTION

1. Field of the Invention

The present invention relates to image forming apparatuses, such as copying machines and printers, using electrophotography and electrostatic recording.

2. Description of the Related Art

In recent years, advances have been made in techniques for recording image information in full color, and the need for faster, less expensive, and clearer outputs of hard copies is increasing.

Various measures have been taken to ensure that existing electrophotographic image forming apparatuses can satisfy the above need.

For example, in order to satisfy the need for higher speed, some color image forming apparatuses use four image bearing members corresponding to four colors (hereinafter referred to as a "four drum type"), and image forming processes including charging, exposure, and development are performed at respective stations for each color. This allows image formation to be performed four times as fast as in an apparatus having only one image bearing member.

Furthermore, by changing the fixing speed so as to respond to various types of transfer materials, image quality can be improved for different transfer materials. For example, the fixing speed is generally decreased when forming images on cardboard, OHP sheets, or the like.

In this case, the fixing speed can be changed, without changing the image forming speed in the image forming processes prior to fixing, by using a fixing conveyor belt.

Since the above structure tends to increase the overall size of the apparatus, another method has been proposed in which the image forming speed is changed in all the processes. This eliminates the necessity for a fixing conveyor belt and results in a reduction in the size of the main body of the image forming apparatus. Such size reduction also leads to cost reduction, and as a result, a compact image forming apparatus can be provided at low cost.

However, since all characteristics, such as the characteristics of a photoconductive member serving as an image bearing member, the developing characteristics, and the transfer characteristics, are changed in accordance with the image forming speed, the image output characteristics are also changed as a result.

For example, regarding the characteristics of the photoconductive member, even when the exposure level per unit area is fixed, the potential of the photoconductive member at a developing section is not fixed because the time when the photoconductive member rotates from the exposure section to the developing section is changed.

Similarly, the developing characteristics will change along with the image forming speed.

Changes in the characteristics in the respective image forming processes appear as a change in image output characteristics.

As described above, conventional image forming apparatuses have a drawback in that it is difficult to obtain an image having a desired image density due to a change in image output characteristics which result when the image forming speed is changed.

SUMMARY OF THE INVENTION

Accordingly, an object of the present invention is to provide an image forming apparatus in which the image forming speed is variable.

Another object of the present invention is to provide an image forming apparatus in which a high-gradation image can be obtained even when the image forming speed is varied.

In order to achieve the above objects, according to an aspect of the present invention, there is provided an image forming apparatus including: an image bearing member; image forming means for forming an electrostatic image on the image bearing member in accordance with an image signal; developing means for developing an electrostatic image formed on the image bearing member; transfer means for transferring a developed image on the image bearing member onto a transfer material; speed setting means for selectively setting a moving speed of the image bearing member; and gamma characteristic selection means for selecting a gamma conversion characteristic for converting the relationship between the image signal and an output density in accordance with the moving speed of the image bearing member.

Further objects, features and advantages of the present invention will become apparent from the following description of the preferred embodiments with reference to the attached drawings.

DESCRIPTION OF THE PREFERRED EMBODIMENTS

Preferred embodiments of the present invention will be described below with reference to the attached drawings.

Figure 1:
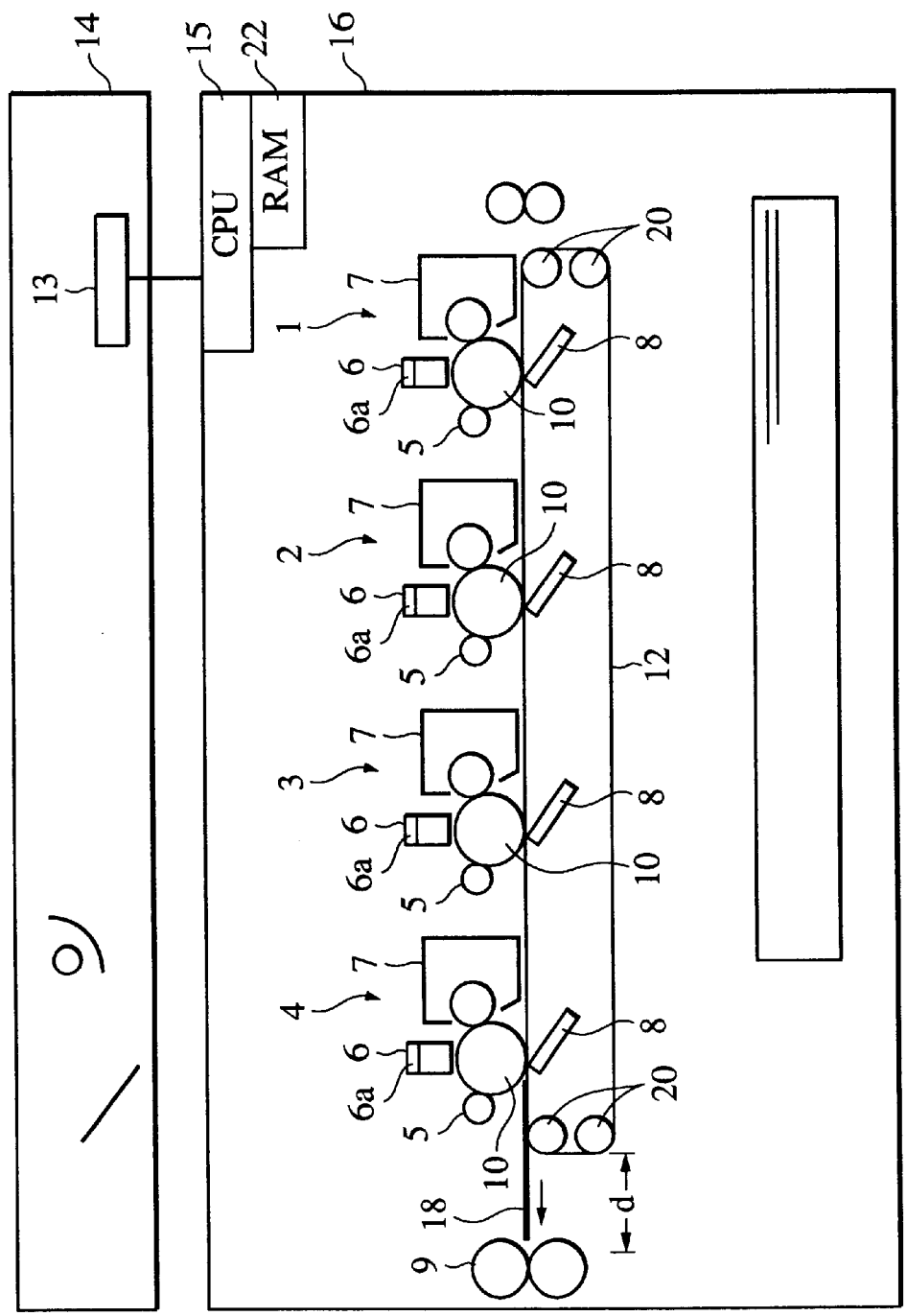
FIG. 1 is a cross-sectional view of an image forming apparatus according to a first embodiment of the present invention.

FIG. 1 is a cross-sectional view of an image forming apparatus according to a first embodiment of the present invention. The image forming apparatus is a full-color image forming apparatus of a four drum type. The image forming process of the image forming apparatus will be described briefly.

A CCD 13 in a reading section 14 converts input incident light from a document into image signals and outputs the image signals to an image signal processor (such as a CPU) 15 of an image forming section 16, as is known in the art.

Next, each photoconductive drum 10, serving as an image bearing member in the present invention, is uniformly charged by a respective primary charger 5 and is exposed according to corresponding image signals input from the CCD 13 by a respective LED array 6, serving as exposure means, thereby forming an electrostatic latent image thereon, as is known in the art.

Each electrostatic latent image is developed into a visible toner image by a respective developing device 7, serving as developing means, and is transferred onto transfer paper 18 conveyed on a conveyor belt 12 by a respective transfer charger 8, serving as transfer means. The conveyor belt 12 is, e.g., an endless belt that travels around a plurality of guide rollers 20, where at least one of the guide rollers 20 may be driven at a controlled, variable speed, as is known in the art. A composite toner image transferred onto the transfer paper 18 is then fixed by a fixing device 9, serving as fixing means.

The distance "d" between the transfer section (including the various transfer chargers 8 and the conveyor belt 12) and the fixing section (including the fixing device 9) is shorter than the maximum length of the transfer paper 18 in the paper feeding direction (see arrow), and the fixing speed is substantially equal to the moving speed of the surface of each photoconductive drum 10.

While the number of gradation levels per pixel is set at two in this embodiment, the present invention is similarly advantageous in a case in which the number of gradation levels is more.

In this embodiment, the above-described image forming process is simultaneously performed for four colors in order to achieve faster full-color image formation.

A yellow unit 1 serving as a first station, a magenta unit 2 serving as a second station, a cyan unit 3 serving as a third station, and a black unit 4 serving as a fourth station are provided so as to form four images corresponding to these respective colors. In these stations, developing agents having different spectral characteristics in accordance with the respective colors, that is, toners of different colors, are respectively stored.

The image forming apparatus in this embodiment has three image forming modes, namely, a fast mode, a standard mode, and a slow mode.

The image forming speed, which corresponds to the moving speed of the photoconductive drum surface, is set at, for example, either 150 mm/sec or 100 mm/sec. Of course, this speed is arbitrarily determined and may be changed by a user. In the above case, the corresponding image output speed (the number of image output prints per minute) is, for example, 30 ppm (print per minute) or 20 ppm.

Figure 2:
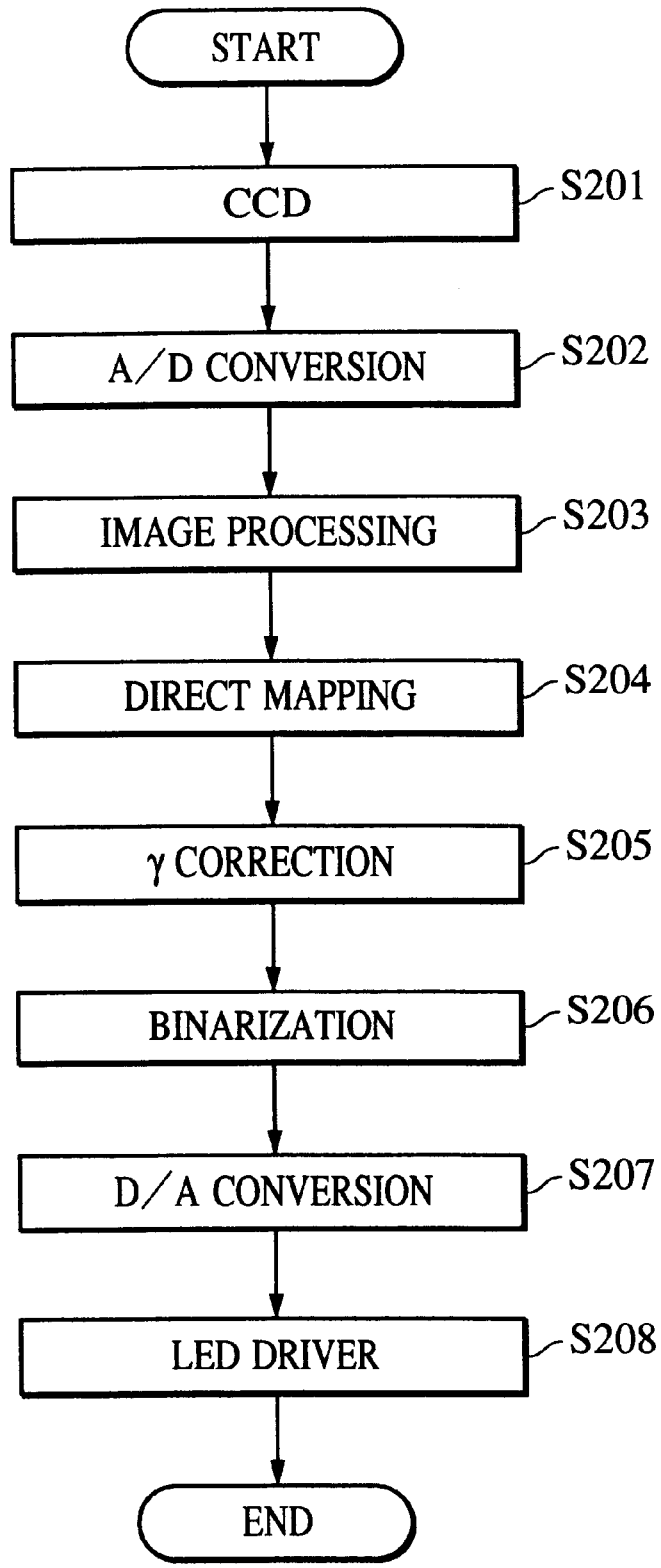
FIG. 2 is a flowchart showing the flow of image signals during image formation by the image forming apparatus.
Figure 3:
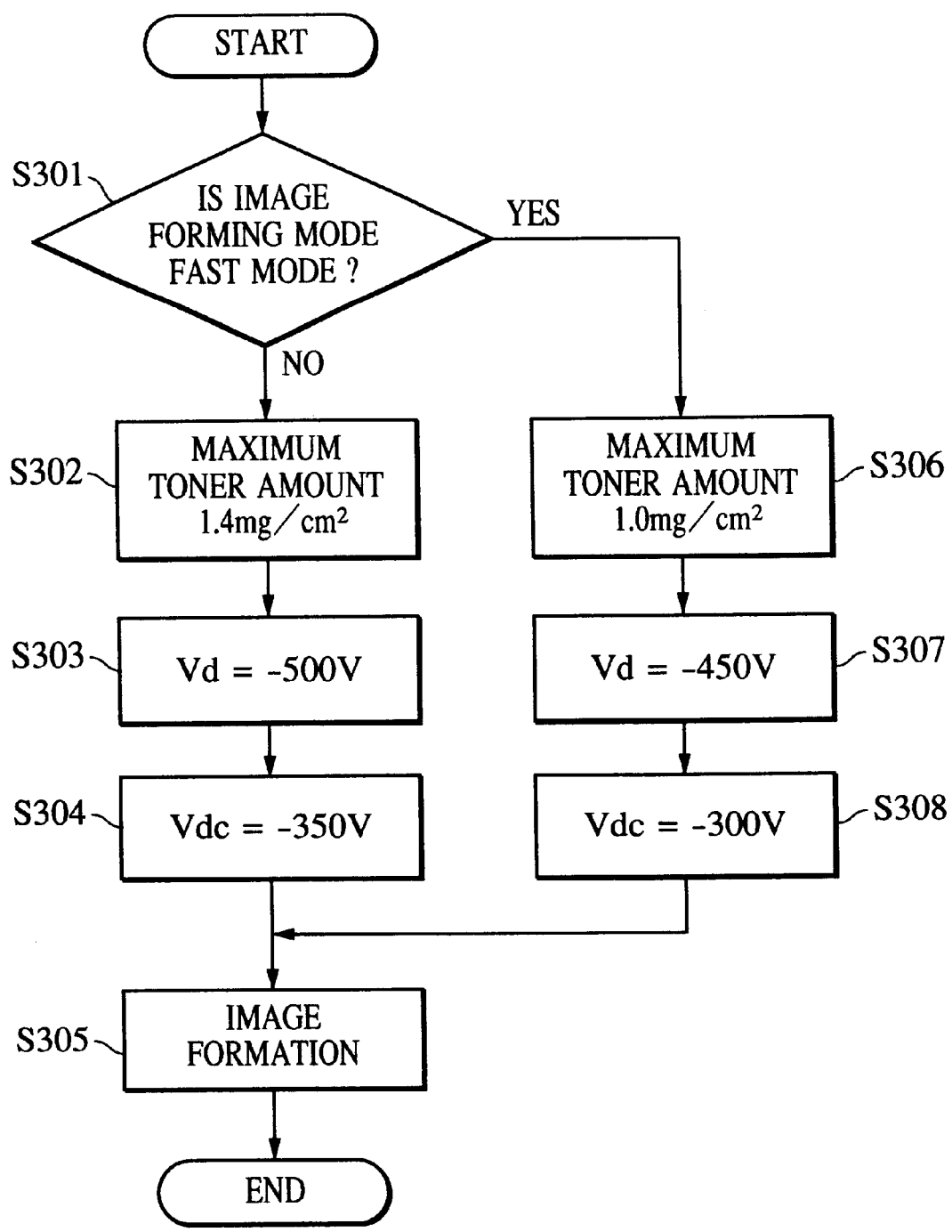
FIG. 3 is a flowchart showing the operation of the image forming apparatus in an environment where the temperature is 24° C. and the humidity is 60%.

Image formation in a standard mode will now be described with reference to FIGS. 2 and 3. FIG. 2 is a flowchart showing the flow of image signals during image formation by the image forming apparatus shown in FIG. 1, and FIG. 3 is a flowchart showing the operation of the image forming apparatus in an environment where the temperature is 24° C. and the humidity is 60%.

Referring to FIG. 2, in the image forming apparatus, R, G, and B signals input from the CCD 13 in the reading section 14 (or alternatively from an external or internal computer (not shown)) are subjected to A/D conversion (Step S201), image processing (Step S202), and direct mapping by a color conversion section (Step S203), and the signals are thereby converted into C, M, Y, and K signals.

Next, gamma conversion is executed to convert the C, M, Y, and K image signals so that the image signals and output densities have a predetermined relationship, thereby optimizing the printer gamma characteristic (Step S205). These 8-bit C, M, Y, and K image signals are converted into 1-bit signals and D/A-converted by a binarizing section in the CPU 15 (Steps S206 and S207), and are transferred to an LED driver 62 in the LED array 6 so as to perform exposure operation (Step S208).

When an image signal, which provides the highest density in response to an input 8-bit signal for each color, is designated "ffh" (hexadecimal), the amount of toner per unit area for image formation for each color in response to ffh is 0.50 mg/cm$^2$ in the standard mode. In this case, the density of each color image is 1.60. Furthermore, processing is executed by a direct mapping section in the CPU 15 so that the total amount of toner of a secondary color and a tertiary color may be as much as 1.4 mg/cm$^2$.

This value is chosen since the amount of toner, which can provide sufficient fixing ability so as to achieve the image output speed of 20 ppm when the image forming speed is 100 mm/sec, is 1.4 mg/cm$^2$. This value can also provide sufficient color reproduction in the standard mode (Step S302 in FIG. 3).

Process conditions for the toner amount will now be described. The primary charge potential of the photoconductive drum (hereinafter referred to as "Vd") is −500 V, the potential of a portion exposed in response to ffh (hereinafter referred to as "Vff") is −150 V, and the DC component of developing bias (hereinafter referred to as "Vdc") is −350 V. That is, the developing contrast (Vff−Vdc) is 200 V, and Vback (Vdc−Vd) is 150 V (Steps S302, S303, and S304).

It is noted that the above values are set in an environment in which the air temperature is 24° C. and the humidity is 60%. The conditions are optimally controlled so that the amount of toner of each color per unit area is 0.50 mg/cm$^2$, based on temperature and humidity data detected by an environment sensor (not shown).

In contrast, in a fast mode, the toner amount for image formation for each color in response to ffh is controlled to be 0.40 mg/cm$^2$ (Step S301).

In the fast mode, the process conditions Vd, Vdc, and Vff are −450 V, −300 V, and −150 V, respectively (Steps S307 and S308). That is, the developing contrast is 150 V, which is 50 V lower than that in the standard mode, and Vback remains unchanged at 150 V. In this case, the maximum density for each color is 1.4. Processing is executed by the direct mapping section so that the maximum amount of secondary and tertiary color toners per unit area is 1.0 mg/cm$^2$ (Step S306).

With this, the color reproduction range is made slightly narrower than that in the standard mode, and thus it becomes possible to operate with an image output speed of 30 ppm and an image forming speed of 150 mm/sec without reducing fixing ability.

In contrast, in a slow mode, image formation is performed under potential conditions similar to those in the standard mode. This mode is advantageous, in particular, when using a thick paper or a special type of paper for forming an image thereon.

The amount of toner of each color per unit area for image formation in response to ffh is set at 0.50 mg/cm$^2$, in a manner similar to that in the standard mode. In this case, the density of each color is 1.60.

Processing is executed by the direct mapping section so that the total amount of toners of secondary and tertiary colors per unit area is up to 1.4 mg/cm$^2$.

Figure 4:
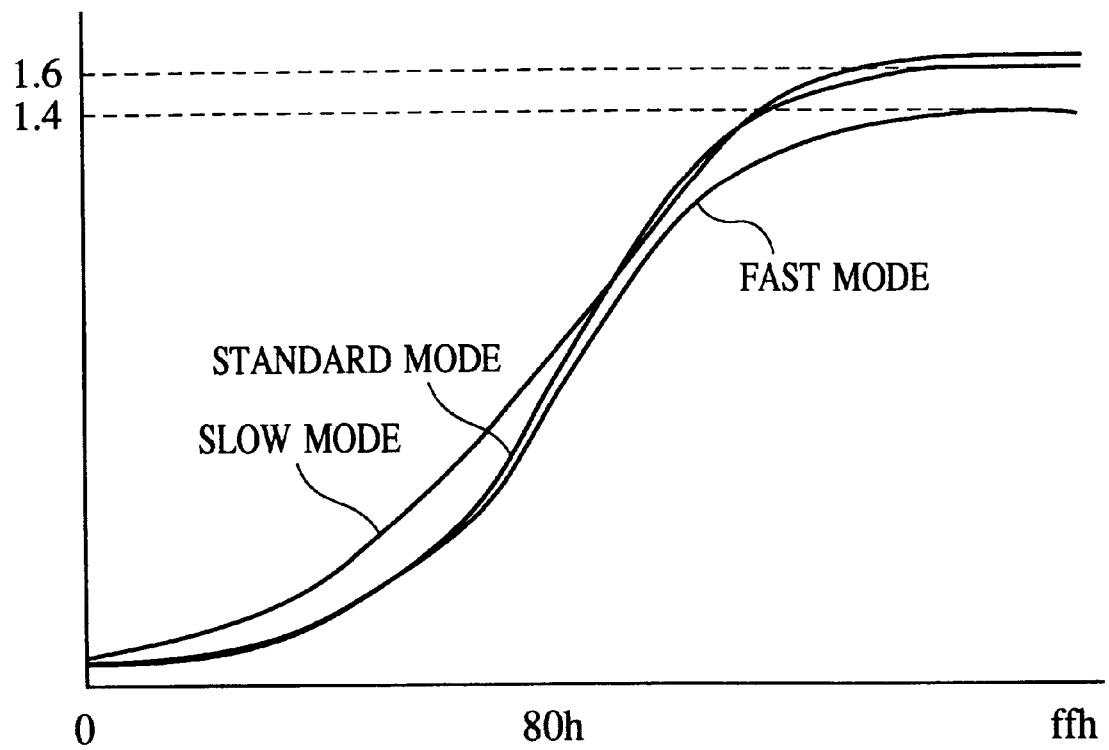
FIG. 4 is a graph showing image output characteristics when image formation is performed at three image forming speeds in the image forming apparatus.

FIG. 4 is a graph showing image output characteristics when image formation is performed at such three image forming speeds in the image forming apparatus shown in FIG. 1. In FIG. 4, the horizontal axis represents the density signal output from the image forming apparatus, and the vertical axis represents the density of an image formed by the image forming apparatus.

In an image forming apparatus having such image output characteristics, a gamma conversion section in the CPU 15 converts the image output characteristics so as to properly perform color reproduction and toner reproduction.

Figure 5:
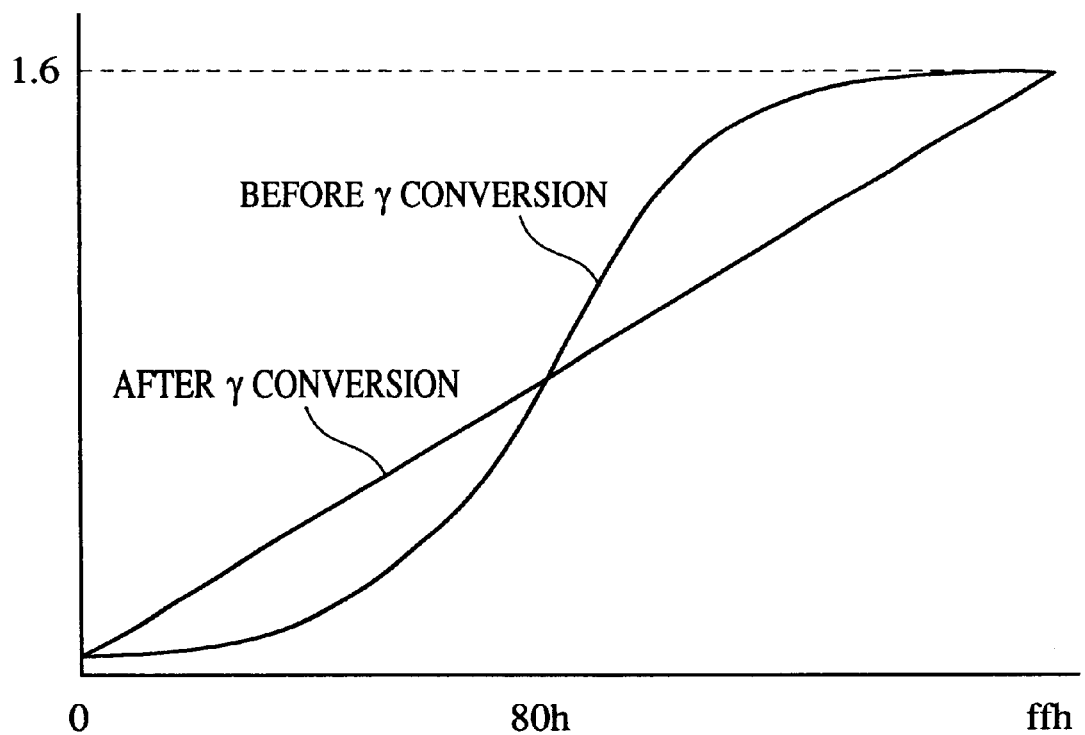
FIG. 5 is a graph showing image output characteristics before and after gamma conversion at a standard speed in the image forming apparatus.

Gamma conversion is carried out with reference to a lookup table stored in the CPU 15. FIG. 5 is a graph showing image output characteristics before and after gamma conversion in the standard mode in the image forming apparatus shown in FIG. 1. In FIG. 5, the horizontal axis represents the density signal output from the image forming apparatus, and the vertical axis represents the density of an image formed by the image forming apparatus.

As shown in the graph, the image output characteristic can be converted into a desired form by gamma conversion, and this finally achieves desired color reproduction.

In this embodiment, since the image output characteristic varies in accordance with the image forming speed, as shown in FIG. 4, lookup tables for gamma conversion are prepared for each of the three image forming speeds.

As a result, it is possible to obtain desired color reproduction at each of the image forming speeds. The user can consistently obtain the optimal image by selecting the image forming mode most suitable for the needs.

An image forming apparatus according to a second embodiment of the present invention will now be described. The configuration of the image forming apparatus of this embodiment is similar to that in the above-described first embodiment, and has three image forming speeds each corresponding to an image forming mode in a manner similar to that in the first embodiment. This embodiment is characterized in that it performs a calibrating operation.

Description will be given of a calibrating operation in a standard mode of this embodiment.

Figure 6:
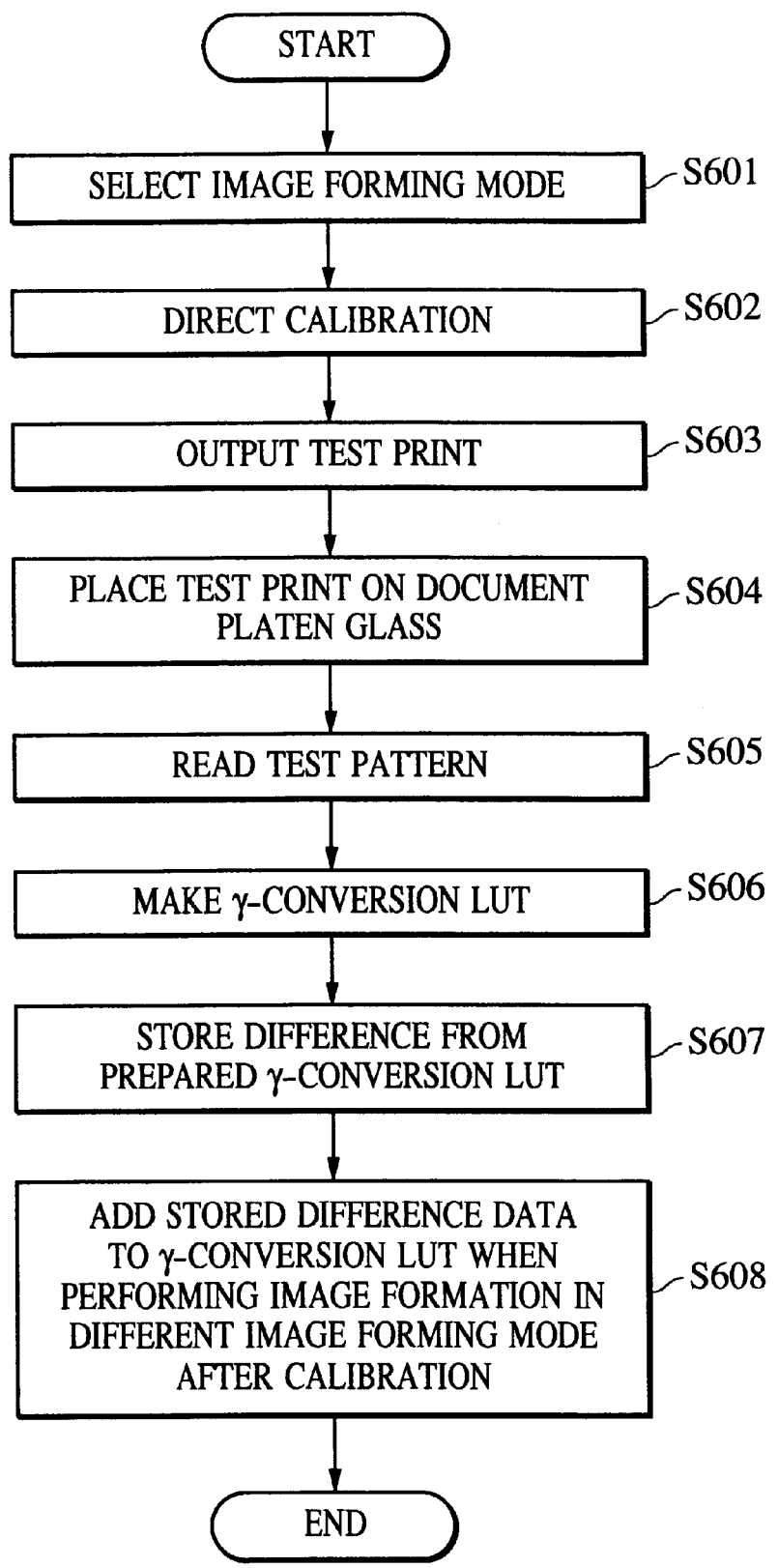
FIG. 6 is a flowchart showing a calibrating operation of an image forming apparatus according to a second embodiment of the present invention.

"Calibration" refers to an operation of forming a new lookup table for gamma conversion, as described in detail, for example, with reference to FIG. 6 in Japanese Patent Laid-Open No. 7-131607.

The image forming apparatus of this embodiment has gamma conversion lookup tables for each of the image forming speeds in a manner similar to that in the first embodiment.

When the user directs calibration (automatic tone correction), calibration is executed to form a new gamma conversion lookup table for the standard mode.

As a result, the density output characteristic in the standard speed is optimized, and superior color reproduction is achieved. However, since calibration is carried out only for the standard speed in this case, similar operations must be performed for other image forming speeds.

Accordingly, in the image forming apparatus of this embodiment, the result of calibration for one of the speeds can be fed back to the other two speeds by performing calibration according to a flowchart in FIG. 6 which shows a calibrating operation of the image forming apparatus.

Description will be given with reference to FIG. 6. In the image forming apparatus, calibration is executed by using a reading section 14. Alternatively, similar advantages can be obtained by providing an optical sensor incorporated in the image forming apparatus.

First, the user selects an image forming mode and directs calibration (Steps S601 and S602).

Then, the image forming apparatus outputs a test print for calibration at an arbitrary image forming speed (Step S603). The user places the test print on a document platen glass of the reading section (Step S604). The image forming apparatus reads the test pattern, compares the read pattern with test pattern formation information, and obtains the characteristic of the output density in response to the image signal (Step S605).

Next, the image forming apparatus makes a gamma conversion lookup table so that the output characteristic coincides with a desired output characteristic (Step S606), compares the gamma conversion lookup table with a prepared gamma conversion lookup table, and stores a difference therebetween in memory (e.g., a RAM 22) (Step S607).

When performing an image forming operation at an image forming speed different from the image forming speed for which calibration has been executed, the image forming apparatus adds the stored difference data to a gamma conversion lookup table for the different speed (differential control), and thereby makes a final gamma conversion lookup table (Step S608).

By doing this, advantages similar to those in the above-described first embodiment can be obtained. Furthermore, by executing calibration for one of a plurality of image forming speeds in the image forming apparatus, the results of calibration for all the image forming speeds can be obtained based on differential control. This makes it possible to efficiently provide optimum image quality.

As described above, according to the present invention, in an image forming apparatus having a plurality of image forming speeds, for example, a fast mode, a standard mode, and a slow mode, the most suitable image forming conditions, such as gamma conversion lookup tables, for the respective modes are obtained, and an optimum image can be output at each of the image forming speeds.

By executing calibration only for one arbitrary image forming mode (one image forming speed), the results of calibration for the other image forming modes can be obtained. This makes it possible to efficiently provide optimum image quality.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image forming apparatus comprising:

an image bearing member;

image forming means for forming an electrostatic image on said image bearing member in accordance with an image signal;

developing means for developing an electrostatic image formed on said image bearing member;

transfer means for transferring a developed image on said image bearing member onto a transfer material;

speed setting means for selectively setting a moving speed of said image bearing member; and gamma characteristic selection means for selecting a gamma conversion characteristic relationship between the image signal and an output density in accordance with the moving speed of said image bearing member set by said speed setting means.

2. An image forming apparatus according to claim 1, further comprising:

memory storing a plurality of conversion tables corresponding to a plurality of moving speeds of said image bearing member, wherein said speed setting means selectively sets said image bearing member in one of the plurality of moving speeds, and wherein said gamma characteristic selection means selects one of the plurality of conversion tables in accordance with the moving speed of said image bearing member selectively set by said speed setting means.

3. An image forming apparatus according to claim 1, further comprising:

correction means for creating a gamma conversion characteristic for image formation based on an output test pattern generated when said image bearing member is operable in a first mode at one moving speed, and for correcting a gamma conversion characteristic for image formation during operation of said image bearing member in another mode at another moving speed based on the gamma conversion characteristic created by the correction means.

4. An image forming apparatus according to claim 1, further comprising:

fixing means for fixing a developed image on a transfer material, wherein a fixing speed of said fixing means and the moving speed of said image bearing member are substantially equal to each other.

5. An image forming apparatus according to claim 4, wherein a distance between a transfer section, including said transfer means, and a fixing section, including said fixing means, is shorter than a maximum length of the transfer material in a feeding direction of the transfer material.

6. An image forming apparatus according to claim 4, wherein said speed setting means sets the moving speed of said image bearing member in accordance with the type of the transfer material, or in accordance with a moving speed selected by a user.

7. An image forming apparatus according to claim 1, further comprising:

density control means for changing a maximum density of an image formed by said image forming apparatus in accordance with the moving speed selectively set by said speed setting means.

8. An image forming apparatus comprising:

an image bearing member;

an image forming device for forming an electrostatic image on said image bearing member in accordance with an image signal;

a developing device for developing an electrostatic image formed on said image bearing member;

a transfer charger for transferring a developed image on said image bearing member onto a transfer material;

a speed setting device for selectively setting a moving speed of said image bearing member; and an image signal processor that selects a gamma conversion characteristic relationship between the image signal and an output density in accordance with the moving speed of said image bearing member set by said speed setting device.

9. An image forming apparatus according to claim 8, wherein said image signal processor includes a CPU and memory.

10. An image forming apparatus according to claim 8, wherein said image forming device includes a primary charger and an exposure device arranged opposite said image bearing member.

11. An image forming apparatus according to claim 9, wherein said memory stores a plurality of conversion tables corresponding to a plurality of moving speeds of said image bearing member, wherein said speed setting device selectively sets said image bearing member in one of the plurality of moving speeds, and wherein said image signal processor selects one of the plurality of conversion tables in accordance with the moving speed of said image bearing member selectively set by said speed setting device.

12. An image forming apparatus according to claim 8, wherein said image signal processor further creates a gamma conversion characteristic for image formation based on an output test pattern generated when said image bearing member is operable in a first mode, at one moving speed, and corrects a gamma conversion characteristic for image formation during operation of said image bearing member in another mode, at another moving speed, based on the gamma conversion characteristic created by said image signal processor in the first mode.

13. An image forming apparatus according to claim 8, further comprising:

a fixing device for fixing a developed image on a transfer material, wherein a fixing speed of said fixing device and the moving speed of said image bearing member are substantially equal to each other.

14. An image forming apparatus according to claim 13, wherein a distance between a transfer section, including said transfer device, and a fixing section, including said fixing device, is shorter than a maximum length of the transfer material in a feeding direction of the transfer material.

15. An image forming apparatus according to claim 13, wherein said speed setting device sets the moving speed of said image bearing member in accordance with the type of transfer material, or in accordance with a moving speed selected by a user.

16. An image forming apparatus according to claim 8, wherein said image signal processor further changes a maximum density of an image formed by said image forming apparatus in accordance with the moving speed selectively set by said speed setting device.

* * * * *